No. 813,660. PATENTED FEB. 27, 1906.
T. H. MINER.
LIGHTNING CONDUCTOR.
APPLICATION FILED MAY 1, 1905.
2 SHEETS—SHEET 1.
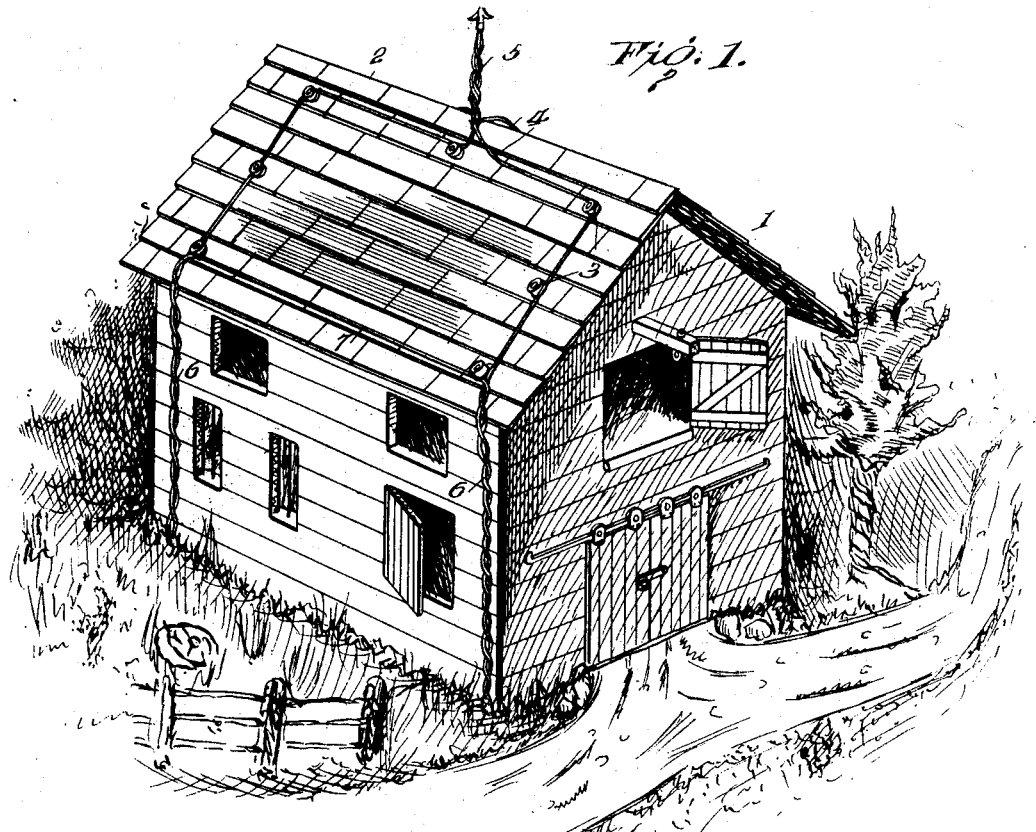
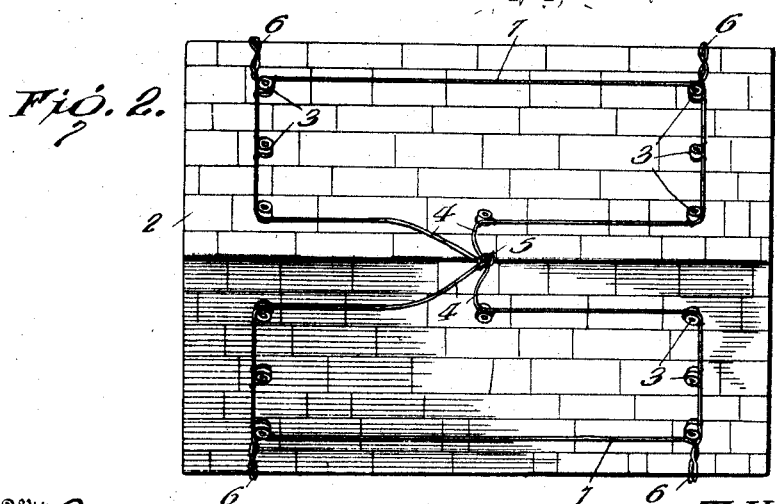

No. 813,660. PATENTED FEB. 27, 1906.
T. H. MINER.
LIGHTNING CONDUCTOR.
APPLICATION FILED MAY 1, 1905.
2 SHEETS—SHEET 2.
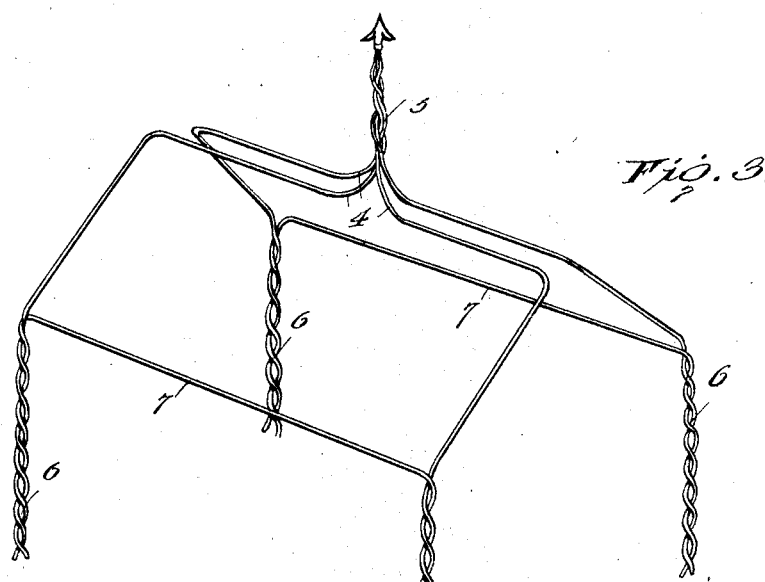
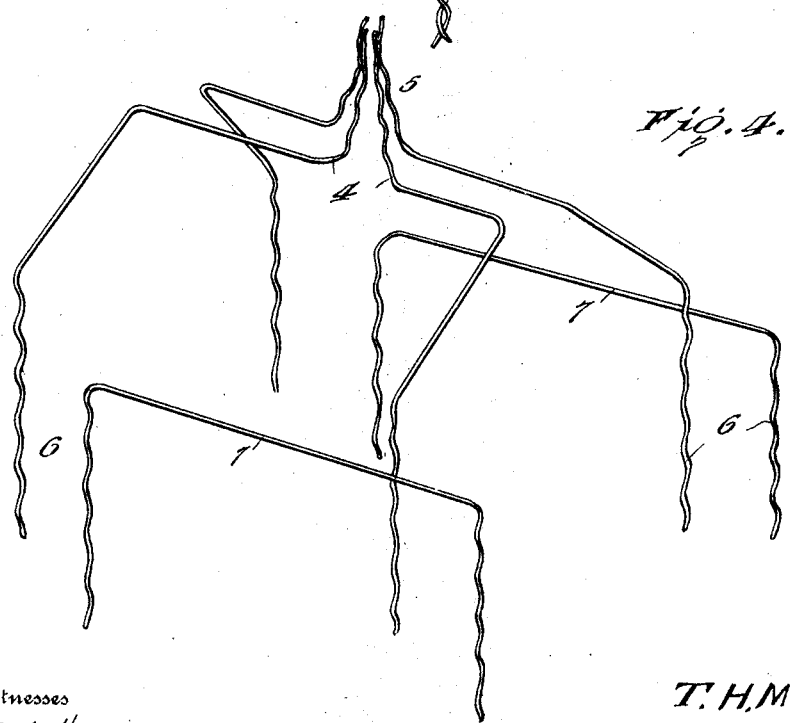
Inventor
T. H. Miner

UNITED STATES PATENT OFFICE.

THOMAS H. MINER, OF WINONA, MISSOURI.

LIGHTNING-CONDUCTOR.

No. 813,660.

Specification of Letters Patent.

Patented Feb. 27, 1906.

Application filed May 1, 1905. Serial No. 258,222.

*To all whom it may concern:*

Be it known that I, THOMAS H. MINER, a citizen of the United States, residing at Winona, in the county of Shannon and State of Missouri, have invented certain new and useful Improvements in Lightning-Conductors, of which the following is a specification.

The object of this invention is to provide a novel form of means for protecting houses or any buildings from damage which may be caused by lightning.

The invention resides, essentially, in the special arrangement of current-conducting wires which are secured to the building and which will effectively ground any charges of lightning in the immediate vicinity of such building, obviating all likelihood of damage thereto.

For a full description of the invention and also to acquire a knowledge of the details of construction of the means for effecting the result reference is to be had to the following description and accompanying drawings, in which—

Figure 1 is a perspective view of a building having the invention applied thereto. Fig. 2 is a top plan view, bringing out more clearly the arrangement of the conducting-wires and the manner of attaching the same to the building. Fig. 3 is a perspective view showing the conducting-wires alone and connected as when in operable positions. Fig. 4 is a view of the conducting-wires and connections therebetween separated.

Corresponding and like parts are referred to in the following description and indicated in all the views of the drawings by the same reference characters.

In the practical application of this invention it will be understood that the drawings merely illustrate a conventional type or construction of building, the invention being susceptible of use in connection with buildings of various sizes and constructions.

The numeral 1 indicates the building, and the numeral 2 the roof thereof. Suitably attached to the roof 2 of the building are a plurality of insulators 3, which are arranged according to the structure of the building, and said insulators may be of any preferred form at present in common use within the contemplation of the invention. The lightning-conducting means utilized consists, primarily, of a plurality of main charge or conducting wires 4, said wires having intermediate portions thereof brought together at a point preferably near the uppermost portion of the roof of the building and twisted together, as shown at 5. These twisted portions are provided with a spur-head or attracting-point, as shown in Fig. 1. The several conducting-wires extend in all directions from the portion 5, at which they meet, the arrangement of said wires being such that virtually the whole surface area of the roof portion of the building is included thereby. Terminals of the wires 4 extend downwardly at the sides of the building, as shown at 6, and are grounded in the customary manner. The number and length of the various conducting-wires 4 may depend largely upon the size of the building and the general construction thereof. After the wires 4 have been brought together at the portion 5, said wires are extended from said portion 5 and are connected with the insulators 3, which are attached to the roof upon those portions adjacent to which the several wires 4 pass. The customary tie-wires may be utilized in securing the conducting-wires 4 to the insulators. It is designed to reinforce the attachment of the conducting-wires 4 to the roof or other portions of the building by means of supplemental conducting-wires 7, which are preferably extended beneath the roof and which connect the downwardly-extending terminals 6 of certain of the conducting-wires 4. The extremities of these wires 7 are attached to the conducting-wires 4 at approximately the point where the said conducting-wires project from the roof of the building. Further, the ends of the conducting-wires 7 are wrapped about or intertwisted with the downwardly-extending terminals 6 of the conducting-wires, thus increasing the general substantiality of the connection between the latter and the building construction. In order to facilitate laying or attachment of the wires 4 to the building, it is intended that the wires 4 be made in pairs, consisting of a single length of wire bent upon itself about intermediate its ends, and thence extended to form two separate wire elements, which will be grounded in the manner described hereinbefore.

Having thus described the invention, what is claimed as new is—

The combination in a lightning-conductor for buildings, of a plurality of main conducting-wires twisted together intermediate their ends and the twisted portion being located at a central point on the roof of the building and disposed vertically and provided with an attracting-point, the said main conducting-wires diverging in different directions from the said twisted portion and extending therefrom over the roof of the building and thence downwardly to the ground, and supplemental conducting-wires having their end portions intertwisted with the end portions of the main conducting-wires, from the roof of the building to the ground the intermediate portions of said supplemental conducting-wires extending from one main conducting-wire to an opposite main wire, as and for the purpose set forth.

In testimony whereof I affix my signature in presence of two witnesses.

THOMAS H. MINER. [L. S.]

Witnesses:
 I. BOROH,
 JNO. F. CHURCH.